Nov. 29, 1960  A. LEW  2,962,033
DENTAL-FLOSS HOLDER
Filed April 15, 1958
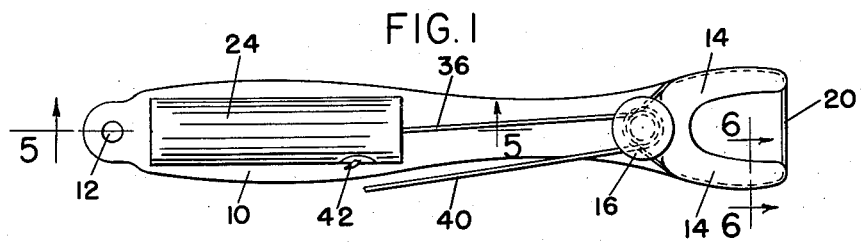
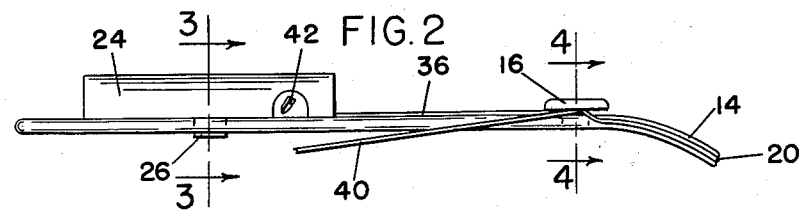
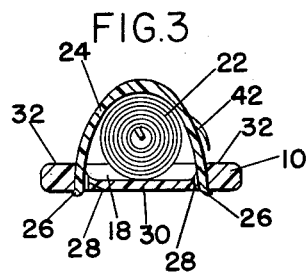
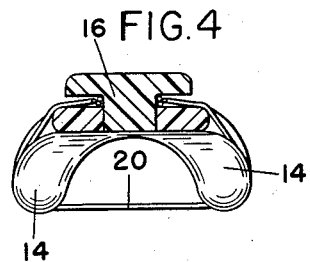
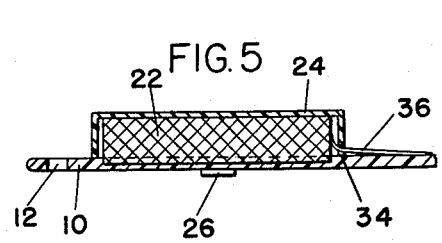
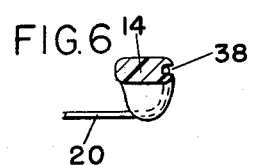
INVENTOR
ABRAM LEW
by Charles R. Fay.
ATTORNEY

United States Patent Office 2,962,033
Patented Nov. 29, 1960

2,962,033

DENTAL-FLOSS HOLDER

Abram Lew, Clinton, Mass., assignor to Barmar Products Corp., Clinton, Mass., a corporation of Massachusetts Filed Apr. 15, 1958, Ser. No. 728,628

4 Claims. (Cl. 132—92)

This invention is an improvement on U.S. Patent No. 2,735,436 and the principal object of the invention resides in the provision of a new and improved dental-floss holder having a particularly novel means for holding the dental-floss on the handle thereof, so that an adequate supply of dental-floss is immediately available at all times, in combination with a new and improved dental-floss severing device therefor.

Another object of the invention resides in the provision of a dental-floss spoolholder which is detachably mounted on the handle of the dental-floss holder itself and comprises a generally U-shaped elongated housing which is open at one side thereof, the open side being provided at its edges with extending resilient legs detachably secured into portions of the handle of the dental-floss holder for quick and easy detachment thereof for the application of a new spool of dental-floss which is held against the handle by the housing.

Other objects and advantages of the invention will appear hereinafter.

Reference is to be had to the accompanying drawings, in which

Fig. 1 is a plan view of the device;

Fig. 2 is an edge view thereof;

Fig. 3 is an enlarged section on line 3—3 of Fig. 2;

Fig. 4 is an enlarged section on line 4—4 of Fig. 2; and

Figs. 5 and 6 are sections on the respective lines in Fig. 1.

The new and improved dental-floss holder illustrated herein is preferably injection-molded of plastic and comprises an elongated handle 10 having a hanger-hole 12 at one end thereof and widening out at the opposite end, terminating in a pair of spaced arms 14. The arms 14 are adapted to hold dental-floss tautly as at 20 in the position shown in Fig. 1 for the use of the device to clean the teeth when the handle 10 is used in the customary manner. The dental-floss is firmly held between the terminal portions of the arms 14 as described in the above identified patent and the leading end of the dental-floss is secured under the button 16 in the manner of said patent.

In the present case, the handle 10 is provided with a generally central rectangular depression generally indicated at 18, this depression being completely defined by a surrounding rim for the purpose of temporarily holding a spool 22 of dental-floss 20 in position on the handle 10.

In order to restrain the spool of dental-floss, a special new and improved housing or holding member 24 is provided, and this is elongated and generally U-shaped in cross-section as clearly shown in Fig. 3 and is adapted to straddle the spool of dental-floss 22 and to be detachably secured to the body 10 of the dental-floss holder in order to hold the dental-floss therein.

At opposite edges of the housing 24, the same is provided with a pair of free-ended resilient feet or the like 26, 26 which are adapted to be snapped down through apertures at 28. These apertures are partially in the rim portion of the holder and extend down somewhat into the bottom portion thereof which is indicated at 30, so that the edges of the housing 24 lie in close contact with the top surface 32 of the holder itself, giving the impression that the portion 24 is an integral part thereof rather than a separate part as is actually the case.

The housing 24 is provided with a forward opening as at 34, see Fig. 5, so that the dental-floss as at 36 may be withdrawn therefrom without disturbing the position of the holder 24 on the main body or handle portion 10 of the dental-floss holder.

In the use of the device, the spool of dental-floss 22 is applied to the depressed tray defined by the continuous rim in the handle, and then the housing 24 is placed over it, with the feet 26 drawn somewhat together by the fingers of the user so as to snap into the openings at 28. The foot portions 26 thereof then protrude outwardly below the under surface of the handle and engage the same to detachably hold the housing in position. The dental-floss is drawn out through the hole 34 and may be wrapped once or twice around the button 16, then across the terminal portions of arms 14, being lodged in the slots at 38 therein, see Fig. 6. The dental-floss is then once again wrapped a time or two about the button 16 so that it is firmly and tautly held in position. The floss may then be drawn to the rear as indicated at 40 and directed under the outstanding cutting edge 42 mounted on the housing 24 for the purpose of severing the dental-floss at this point, so that the used portions thereof may be easily severed and discarded.

Having thus described my invention and the advantages thereof, I do not wish to be limited to the details herein disclosed, otherwise than as set forth in the claims, but what I claim is:

1. A dental-floss holder comprising an elongated handle and means for tautly holding a section of dental-floss thereon in position for use, said handle being generally flat and having a generally rectangular flat depression in one side surface thereof for temporary reception of a spool of dental-floss therein, and an elongated housing of general U-shaped cross section adapted to fit over the spool of dental-floss and conceal said rectangular depression, said housing having edges generally aligned with the edges of the depression, and extending portions at certain edges of said housing adapted for inter-engagement with apertures in the said handle for temporarily securing the housing to the handle in covering position as to the spool of dental-floss, said U-shaped housing being in outstanding relation to the flat handle.

2. The device of claim 1 wherein said extending means are integrally molded with the housing and are resilient so that they can be compressed slightly, thrust through the openings therein and allowed to expand to lightly hold the housing to the handle.

3. The device of claim 1 wherein the elongated housing has an aperture at one end thereof for the exit of the dental-floss toward the dental-floss holding means.

4. A dental-floss holder comprising a generally flat handle and means adjacent one end thereof for holding dental-floss in spread condition and adapted for use, and means for holding a spool of dental-floss on said handle, said means comprising a detachable elongated semi-circular housing having an open side adapted to face a flat surface of the handle and to hold a spool of dental-floss within the housing and on said flat surface, interengaging means on the housing and said handle for temporarily holding the housing in position on the handle, said means comprising apertures in the handle and a pair of integrally-molded extending feet on the housing, said feet being adapted to engage the apertures which extend through the handle, said feet extending through the apertures and to the opposite flat side surface of the handle and frictionally holding the housing in position on the handle in dental-floss covering position.

References Cited in the file of this patent

UNITED STATES PATENTS

| | | |
|---|---|---|
| 786,678 | Rawlins | Apr. 4, 1905 |
| 1,417,518 | Henerlau | May 30, 1922 |
| 2,233,936 | Campbell | Mar. 4, 1941 |

FOREIGN PATENTS

| | | |
|---|---|---|
| 19,899 | Great Britain | July 2, 1903 |